Patented Dec. 17, 1929

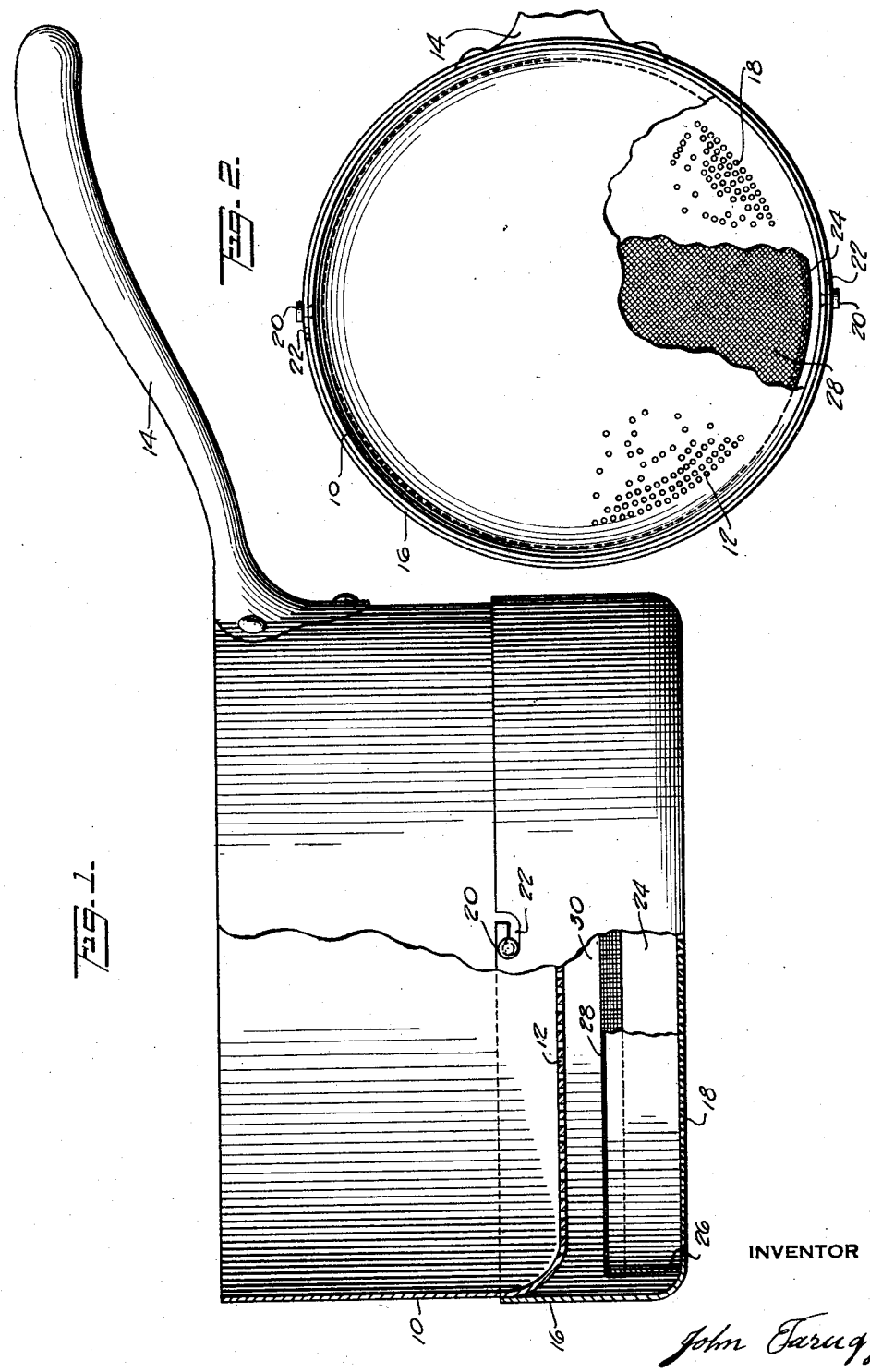

1,739,546

UNITED STATES PATENT OFFICE

JOHN FARUGGIA, OF BRONX, NEW YORK

COOKING UTENSIL

Application filed August 30, 1929. Serial No. 389,362.

The present system of frying food in a restaurant, such as French fried potatoes, croquettes, cutlets, fish and the like, is to place the commodity in a wire mesh basket then placing the whole in a pot of hot grease.

Since most of the commodities named are rolled in bread crumbs or cracker dust before placing them in the frying basket, it is obvious that a large quantity of breading will become dislodged from the commodity and drop into the hot grease. Continuous frying of the different commodities would soon cause the grease to become dirty and smoky due to the dislodged bread crumbs massed at the bottom of the pot of grease.

The object of my invention is to provide a grate with a surface covering of very fine wire mesh, placing same between an upper and lower perforated member in a position which will cause any of the dislodged bread crumbs or food matter to fall upon the surface of said grate and adhere to it.

Another object is to provide means to enable the cook to easily remove the grate at predetermined periods and replace a clean one.

In the accompanying drawings I have illustrated my invention in which

Figure 1 is a part sectional and part elevational view of my device.

Fig. 2 is a plan view with the handle broken away.

The device consists of a pot 10 having a perforated lower surface 12 and a handle 14.

A pan 16 with a perforated lower surface 18, is placed over the bottom of the pot 10 and is adapted to be secured to the side wall of the pot by means of pins 20, projecting outward from the wall, engaging bayonet slots 22 in the pan 16.

Before attaching the pan 18 to the pot 10 a grate 24 consisting of a frame 26 with a surface covering of fine wire mesh 28, is placed in the pan 16 as shown.

It will be noted that a space 30 is provided between the upper surface of the grate 24 and the bottom of the pot 10 when assembled.

With this construction, the three parts are adapted to be quickly disassembled for the purpose of replacing a clean grate.

In the drawing I have shown the lower surface of the pot 10 and pan 16 as perforated but either one or both may have a wire mesh covering such as shown on the grate.

It will be obvious from the foregoing that when the device is in use any particles of breading or food matter becoming dislodged from the commodity in the pot 10, will pass through the perforation 12 to the mesh 28 of the grate 24. Since the mesh 28 is very fine, the particles cannot pass through, therefore cannot get into the pot of hot grease, which permits the use of the grease over a much longer period of time than could be possible by the present method of frying.

Having described my invention I claim:

1. A cooking utensil comprising a perforated pot, a perforated pan secured to said pot and a grate in said pan.

2. A cooking utensil comprising a pot with perforations over the entire lower surface, a detachable pan with perforations over the entire lower surface, attached to said pot, and a grate having a fine mesh upper surface, interposed between said pot and pan.

3. A cooking utensil comprising a pot with a perforated lower surface, a detachable perforated pan attached to said pot by pin and bayonet slot means, and a removable grate with fine mesh surface placed at a predetermined distance from the lower surface of said pot and supported by said pan.

In witness whereof I have hereunto set my hand.

JOHN FARUGGIA.